United States Patent Office 3,686,262
Patented Aug. 22, 1972

---

3,686,262
PREPARATION OF (2-CYANOETHYL) KETONES
Siemen H. Groen and Johannes J. M. Deumens, Geleen, Netherlands, assignors to Stamicarbon N.V., Heerlen, Netherlands
No Drawing. Filed Sept. 15, 1970, Ser. No. 72,494
Claims priority, application Netherlands, Sept. 26, 1969, 6914590
Int. Cl. C07c *121/02, 121/34*
U.S. Cl. 260—465.1                                 5 Claims

ABSTRACT OF THE DISCLOSURE

A process for the preparation of (2-cyanoethyl) ketones by the hydrolysis of the corresponding (2-cyanoethyl)-N-substituted ketoimine with the subsequent recovery of a primary amine, the primary amine boiling at a lower temperature than water and/or forming with water an azeotrope boiling at a lower temperature than water and carrying on its nitrogen atom the same group as that of the nitrogen atom of the corresponding ketoimine is disclosed. When the resulting ketone is 5-cyanopentanone-2 this may be used as a starting product for the preparation of α-pipecoline.

BACKGROUND OF THE INVENTION

The present invention relates to a process for the preparation of (2-cyanoethyl) ketones by hydrolysis of the corresponding (2-cyanoethyl) - N - substituted ketoimines. A similar process has already been proposed in the U.S. Pat. 2,768,962. According to this patent, the compound to be hydrolyzed can be prepared from acrylonitrile and an N-substituted ketoimine, while the N-substituted ketoimine can be synthesized from a primary amine and the subject ketone.

According to the present invention, and with respect to the following reactions, the hydrolysis of (2-cyanoethyl)-N-substituted ketoimines yields a primary amine in addition to the (2-cyanoethyl) ketone (III). In the resulting primary amine, the nitrogen atom thereof carries the same substituent as carried by the nitrogen atom in the ketoimine. If the primary amine is then recovered, it can be reused for the preparation of the compound to be hydrolyzed (a (2-cyanoethyl) - N - substithted ketoimine) by causing the primary amine thus recovered to react with the subject ketone (I) and subsequently converting the resulting ketoimine with acrylonitrile (II). A (2-cyanoethyl) ketone is thus obtained in an indirect way from acrylonitrile and the ketone in question, which is of great significance since in several cases direct reaction of acrylonitrile with a ketone often produces undesired by-products.

The preparation of 3-(2-cyanoethyl)-pentanone-2 according to the present invention with cyclohexylamine being used as the primary amine, is exemplified by the following reactions:

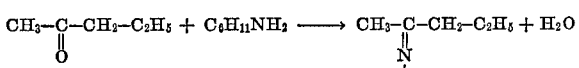

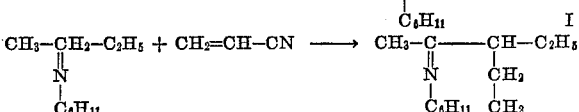

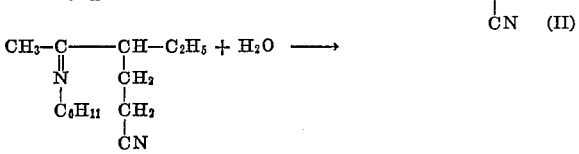

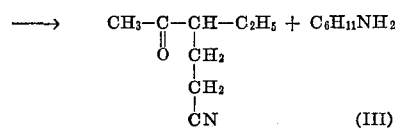

According to the above-mentioned U.S. patent, the hydrolysis of (2-cyanoethyl)-N-substituted ketoimines, as well as the hydrolysis of similar aldimines, can be effected with an acid, for instance with sulphuric acid. However, application of acid in this hydrolysis has the disadvantage that the resulting hydrolysis mixture contains the primary amine not in the free form, but in the form of a salt. The working up of such an acid hydrolysis mixture, and then obtaining the primary amine in its free form, is a fairly complicated operation. In addition, this procedure requires the use of a base, for example sodium hydroxide, to liberate the amine.

DESCRIPTION OF THE INVENTION

It has now been found that in the case of (2-cyanoethyl) - N - substituted ketoimines, the hydrolysis reaction can very suitably be conducted without an acid, thereby avoiding the disadvantages thereof, if the starting material is a (2-cyanoethyl)-N-substituted ketoimine of the general formula:

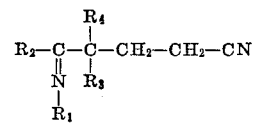

wherein $R_1$ and $R_2$ are hydrocarbon radicals of 1–8 carbon atoms and $R_3$ and $R_4$ are hydrogen, hydrocarbon radicals of 1–8 carbon atoms or 2-cyanoethyl groups and wherein $R_2$ and $R_4$ together with the two adjacent carbon atoms can form a ring structure of 5, 6 or 7 carbon atoms, which, upon hydrolysis, yields a primary amine of the general formula:

where $R_1$ is the same group as identified above, the primary amine boiling at a lower temperature than water and/or forming with water an azeotrope boiling at a lower temperature than water. Suitable starting materials are disclosed in U.S. Pat. 2,768,962; however, the preferred method of preparation of a mono-(2-cyanoethyl) acetonimine to be hydrolysed according to the present invention is described in application Ser. No. 30,597, filed Apr. 21, 1970, the disclosure of which is hereby incorporated by reference. When a ketoimine having the above-mentioned properties is subjected to distillation conditions in the presence of water, the ketoimine can be hydrolyzed almost completely with formation of a distillate containing the primary amine and a residue containing the (2-cyanoethyl) ketone. Surprisingly, this is neither attended with steam distillation of the starting compound nor with an undesired side reaction, such as hydrolysis of a cyano group to acid amide. The (2-cyanoethyl) ketones thus produced are of the general formula:

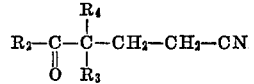

where $R_2$, $R_3$ and $R_4$ are as identified above.

The present invention, therefore, provides a process for the preparation of (2-cyanoethyl) ketones by hydrolysis of the corresponding (2-cyanoethyl)-N-substituted ketoimines to a primary amine, characterized in that the starting material is a (2-cyanoethyl)-N-substituted ketoimine which upon hydrolysis yields a primary amine boiling at a lower temperature than water and/or forming an azeotrope with water boiling at a lower temperature than water and in that the ketoimine starting material is distilled in the presence of water to yield a distillate containing the primary amine and a residue containing the (2-cyanoethyl) ketone.

In comparison with the acid hydrolysis the process according to the present invention has the important advantage that no acid is required, and hence no base either, for liberating the primary amine. In addition, conducting the process is much simpler.

Several substituents attached to the nitrogen atom, as represented by $R_1$ above, of the ketoimine to be hydrolyzed, which meet the requirement of hydrolyzing with formation of a primary amine which has a lower boiling point than water and/or combines with water to yield an azeotrope having a lower boiling point than water are hydrocarbon radicals having from 1 to 8 carbon atoms. Examples of such substituents are methyl, ethyl, n-propyl, isopropyl, n-butyl, isobutyl, secondary butyl, n-hexyl, cyclohexyl, isopentyl, 1-methylbutyl, 1-ethylpropyl and 2-methylbutyl. Preferred substituents are n-propyl, isopropyl, isobutyl, n-butyl, secondary butyl or cyclohexyl. Application of cyclohexyl as a substituent has the special advantage that the cyclohexylamine to be formed in the hydrolysis reaction is a particularly suitable amine for the preparation of various (2-cyanoethyl)-N-substituted ketoimines.

The process according to the invention s preferably carried out under atmospheric pressure. A lower pressure can also be employed, but the lower distillation temperature attendant with it may have an unduly lowering effect on the reaction rate. Application of a pressure above atmospheric is equally possible, but may have the drawback that the higher distillation temperature will give rise to undesired side reactions.

The process of the present invention is conducted at a temperature not in excess of the temperature corresponding to the boiling conditions of the water at the pressure employed. When the reaction is carried out at atmospheric pressure this means a reaction temperature not in excess of about 100° C.

In the process according to the present invention, one molecule of water per molecule of the compound to be hydrolyzed is required for the hydrolysis reaction. Further, the amount of water is needed which distils over with the primary amine. Hence, the more water distils over with the primary amine, the larger the quantity of water to be supplied. Normally, a very good result can be obtained with 1–20 molecules of water per 1 molecule of the compound to be hydrolyzed. The ketones produced according to the present invention enjoy several uses. For example, when the resulting ketone is 5-cyanopentanone-2 (also known as 5-oxocapronitrile), the product can be used as the starting material for the preparation of α-pipecoline, as described in the Journal of the American Chemical Society, 72, 1950, page 2594, the disclosure of which is hereby incorporated by reference. Uses for the primary amine recovered have been stated above.

The process according to the present invention will be further elucidated in the following non-limiting examples. All of the following examples were conducted at atmospheric pressure unless other pressures are stated:

Example I

In a flask of 100 milliliters capacity, provided with a distillation column, 16.6 grams of N-butyl-5-cyanopentanone-2-imine (100 millimoles) was heated together with 15 grams of water. At about 78° C. butylamine starts distilling over. The distillation was continued until pure water began to distill. Titrimetric and mass-spectrometric analysis showed that the aqueous distillate contained 7 grams of butylamine (96 millimoles). The homogeneous distillation residue left in the flask was extracted with ether. After the resulting solution had been dried, the ether was removed and the residue distilled at reduced pressure of 0.7 mm. Hg. This yielded 10.3 grams of 5-cyanopentanon-2 (93 millimoles, boiling point 63° C. at 0.7 mm. mercury, $n_D^{25}$ 1.4300). The yields of 5-cyanopentanone-2 and butylamine are 93% and 96%, respectively.

Example II

In a flask of 100 milliliters capacity, provided with a distillation column, 20.6 grams of a mixture consisting of about 90% by weight of N-cyclohexyl-5-cyano-3-methylpentanone-2-imine and about 10% by weight of N-cyclohexyl-6-cyanohexanone-3-imine (100 millimoles in all) was heated together with 35 grams of water. A mixture of cyclohexylamine and water distilled over and heating was continued until pure water began to distill. Mass-spectrometric analysis showed that the aqueous distillate contained 9.5 grams of cyclohexylamine which corresponded to a yield of 96%, calculated on the quantity of starting imine.

The liquid left in the column was then extracted with ether. After drying, and removal of the ether by means of distillation, 12.3 g. of residue remained. Mass-spectrometric analysis showed that this residue consisted of 90% by weight of 5-cyano-3-methylpentanone-2 and of 7% by weight of 6-cyanohexanone-3. Calculated on the quantity of original imine, the total yield of the two cyanoketones equalled 95%.

Example III

In a flask of 250 milliliters capacity, provided with a distillation column, 38.4 grams of N-cyclohexyl-5-cyanopentanone-2-imine (200 millimoles) was heated with 36 grams of water. During the reaction, a mixture of cyclohexylamine and water distilled over and was recovered. Heating was continued until pure water began to distill. The distillate contained 19.2 grams of cyclohexylamine (194 millimoles), which corresponded to a yield of 97%. The liquid left in the flask was distilled at reduced pressure. A total of 21 grams of 5-cyanopentanone-2 (189 millimoles) was obtained, which corresponded to a yield of 94.5%.

Example IV

In a flask of 250 milliliters capacity, provided with a feed tube and a splash bulb with cooler, 38.4 grams of N-cyclohexyl-5-cyanopentanone-2-imine was heated to 100° C. Subsequently, steam was passed into the liquid via the feed tube. A mixture of water and cyclohexylamine distilled over and was recovered. The introduction of steam was continued until pure water began to distill. The product was 19.1 grams of cyclohexylamine (representing a yield of 96.5%). The aqueous liquid left in the flask was distilled at reduced pressure to remove the water. A total of 20.9 grams of 5-cyanopentanone was thus obtained, representing a yield of 94%.

Example V

In a flask of 100 milliliters capacity, provided with a distillation column, 24.5 grams of N-cyclohexyl-3-(2-cyanoethyl) - 5 - cyanopentanone-2-imine (100 millimoles) and 25 grams of water were subjected to distillation. The distillation was continued until pure water began to distill. The distillate contained 9.8 grams of cyclohexylamine (yield 99%). After the water left in the flask had been removed by distillation at reduced pressure of about 15 mm. Hg, there remained 16.5 grams of residue which, as appeared from proton resonance spectrometric analysis, consisted almost completely of 3-(2-cyanoethyl)-5-cyanopentanone-2. Distillation of the residue at reduced pressure yielded 15.4 grams of 3-(2-cyanoethyl)-5-cyanopentanone-2 (94 millimoles, boiling point 150° C. at 0.2 mm. mercury pressure, $n_D^{25}$ 1.4360), which corresponded to a yield of 94%.

Example VI

In a flask of 50 milliliters capacity, provided with a distillation column, 16.6 grams of a mixture consisting of about 90% by weight of N-isopropyl-5-cyano-3-methyl-pentanone-2-imine and of about 10% by weight of N-isopropyl-6-cyanohexanone-3-imine (100 millimoles in all), was heated together with 3.6 grams of water. At a temperature between 31 and 35° C. isopropylamine distilled over, which was collected in a flask cooled to −5° C. The product was 5.6 grams of isopropylamine (yield 95%). The distillation residue was freed of water by distillation at reduced pressure of about 15 mm. Hg. The product was 12.2 grams of liquid, which as appeared from proton resonance spectrometric analysis, consisted of 88% by weight of 5-cyano-3-methylpentanone-2 and of 12% by weight of 6-cyanohexanone-3 (98 millimoles in all). Calculated on the total quantity of starting product the total yield of cyanoketone was 98%.

What is claimed is:

1. Process for the hydrolysis of a (2-cyanoethyl)-N-substituted ketoimine of the general formula:

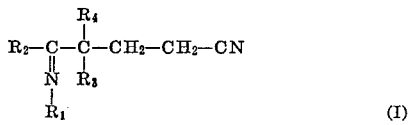

(I)

wherein $R_1$ is an alkyl or cycloalkyl radical of 1–8 carbon atoms and $R_2$ is an alkyl radical of 1–8 carbon atoms, $R_3$ and $R_4$ are hydrogen, alkyl radicals of 1–8 carbon atoms or 2-cyanoethyl groups and $R_2$ and $R_4$ together with the two adjacent carbon atoms can form 5-, 6- or 7-membered carbocyclic ring, reacting said ketoimine with water in an amount of at least equimolecular to said ketoimine, at a temperature not in excess of the boiling temperature of the water at the pressure employed, to form the corresponding (2-cyanoethyl) ketone of the general formula:

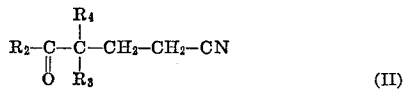

(II)

wherein $R_2$, $R_3$, and $R_4$ are as identified above, and a primary amine of the formula:

$R_1$—$NH_2$ (III)

wherein $R_1$ is as identified above, wherein said ketoimine of Formula I is subjected to distillation conditions in the presence of water with formation of a distillate containing said primary amine of Formula III in its free form, and a residue containing the (2-cyanoethyl) ketone of Formula II.

2. Process as claimed in claim 1 wherein said $R_1$ group is selected from the class consisting of cyclohexyl, n-propyl, isopropyl, n-butyl, isobutyl and secondary butyl.

3. Process as claimed in claim 1 wherein from 1 to 20 moles of water are used per mole of the compound of Formula I to be hydrolyzed.

4. Process as claimed in claim 1 wherein said (2-cyanoethyl) ketone is selected from the class consisting of 5-cyanopentanone-2, 5-cyano-3-methylpentanone-2-, 6-cyanohexanone-3, and 3 - (2 - cyanoethyl) - 5 - cyanopentanone-2.

5. Process for the hydrolysis of a (2-cyanoethyl)-N-substituted ketoimine of the formula:

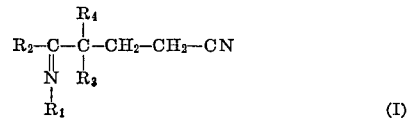

(I)

wherein $R_1$ is an alkyl or cycloalkyl group of 1–6 carbon atoms, $R_2$ is methyl or ethyl, $R_3$ and $R_4$ are hydrogen, methyl or cyanoethyl, said process including:

reacting said ketoimine with water in an amount of at least equimolecular to said ketoimine, at a temperature not in excess of the boiling temperature of the water at the reaction pressure employed, to form the corresponding (2-cyanoethyl) ketone of the formula:

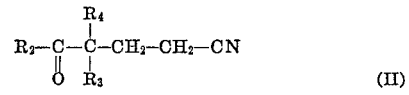

(II)

wherein $R_2$, $R_3$ and $R_4$ are as identified above, and a primary amine of the formula:

$R_1$—$NH_2$ (III)

wherein $R_1$ is as identified above; and subjecting said ketoimine of Formula I to distillation conditions in the presence of water with the formation of a distillate containing said primary amine of Formula III and a residue containing the (2-cyanoethyl) ketone of Formula II.

References Cited

UNITED STATES PATENTS 2,768,962  10/1956  Krimm _____ 260—465.8 X

JOSEPH PAUL BRUST, Primary Examiner

U.S. Cl. X.R.

260—464, 465.5 R, 465.8 R, 563 R, 563 C, 566 R, 583 R, 583 J